(12) United States Patent
Ando et al.

(10) Patent No.: US 8,382,530 B2
(45) Date of Patent: Feb. 26, 2013

(54) CASE-INTEGRATED CONNECTOR

(75) Inventors: Motohiro Ando, Yokkaichi (JP); Shinyu Nagashima, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 14 days.

(21) Appl. No.: 13/221,117

(22) Filed: Aug. 30, 2011

(65) Prior Publication Data

US 2012/0094547 A1    Apr. 19, 2012

(30) Foreign Application Priority Data

Oct. 18, 2010    (JP) ................................. 2010-233804

(51) Int. Cl.
  *H01R 13/502*    (2006.01)
(52) U.S. Cl. ...................................................... 439/701
(58) Field of Classification Search .................. 439/736, 439/276, 936, 589, 587, 701, 712, 710, 686, 439/687
  See application file for complete search history.

(56) References Cited

U.S. PATENT DOCUMENTS

| | | | | |
|---|---|---|---|---|
| 4,284,312 A | * | 8/1981 | Patchett et al. | 439/281 |
| 4,632,121 A | * | 12/1986 | Johnson et al. | 600/372 |
| 6,196,873 B1 | * | 3/2001 | Murakami et al. | 439/595 |
| 2003/0032321 A1 | * | 2/2003 | Wertz et al. | 439/282 |
| 2008/0139028 A1 | * | 6/2008 | Burris et al. | 439/271 |

FOREIGN PATENT DOCUMENTS

JP    2006-315280    11/2006

* cited by examiner

*Primary Examiner* — Edwin A. Leon
*Assistant Examiner* — Harshad Patel
(74) *Attorney, Agent, or Firm* — Gerald E. Hespos; Michael J. Porco; Matthew T. Hespos

(57) ABSTRACT

A case-integrated connector (10) is such that a connector (11) is integrally assembled into a resin-made case body (12) by insert molding using the connector (11) as an insert. The connector (11) is provided with a first housing (20) including a receptacle (22) at one end and a second housing (30) including a connecting portion (33) to be fit into the receptacle (22). The case body (12) covers the outer peripheral surface of a fitting portion (11A) in which the receptacle (22) of the first housing (20) and the connecting portion (33) of the second housing (30) face each other. One of facing surfaces of the receptacle (22) and the connecting portion (33) is formed with annular projections (40) that project outward over the entire periphery to be held in contact with the other facing surface.

8 Claims, 12 Drawing Sheets

CASE-INTEGRATED CONNECTOR

BACKGROUND OF THE INVENTION

1. Field of the Invention

The invention relates to a case-integrated connector in which a connector housing is integrally assembled into a case body.

2. Description of the Related Art

Japanese Unexamined Patent Publication No. 2006-315280 discloses a conventional case-integrated connector in which a connector housing is assembled integrally into a case body. This case-integrated connector includes a connector, and a case body that covers the entire peripheral surface of a housing of the connector. The housing includes a main body for holding a busbar and a relay terminal holder for accommodating female relay terminals. A receptacle is provided at one end of the relay terminal holder and communicates with cavities for accommodating the relay terminals. The busbar and the relay terminals are connected by fitting the main body into the receptacle.

The above-described case-integrated connector is formed by insert-molding the case body using the connector as an insert. Upon insert-molding the case body, an injection pressure of molten resin acts on the housing of the connector. The above-described housing is formed from a plurality of members such as the main body and the relay terminal holder, and resin may leak into the cavities through a small clearance between the inner peripheral surface of the receptacle and the outer peripheral surface of the main body as a fitting portion.

The present invention was developed in view of the above situation and an object thereof is to prevent unintended resin intrusion into the interior of a connector.

SUMMARY OF THE INVENTION

The invention relates to a case-integrated connector in which a connector is assembled integrally into a resin-made case body by insert molding using the connector as an insert. The connector comprises a first housing including a receptacle at one end and a second housing including a connecting portion to be fit into the receptacle. The case body covers the outer peripheral surface of a fitting in which the receptacle of the first housing and the connecting portion of the second housing face each other. At least one of facing surfaces of the receptacle and the connecting portion has at least one annular projection that projects out over substantially the entire periphery to be held in contact with the other facing surface.

There is a concern that molten resin may intrude through a clearance between two assembled members of a connector that is used as an insert and may flow into the interior of the connector when injection pressure of the molten resin acts on the outer periphery of the connector. However, the connector of the present invention has the annular projection formed over the entire periphery on one of the facing surfaces of the receptacle and the connecting portion that constitutes the fitting. The projection contacts the other facing surface and blocks the flow of the molten resin so that the molten resin cannot intrude through the clearance and into the interior portions of the connector beyond the annular projection. Accordingly, the connector can be used as an insert and the case body can be molded around parts of the connector with risk of molten resin flowing through the fitting and into the first housing due to injection pressure of the molten resin injected into a mold.

The second housing may be formed by assembling a plurality of sub-housings and the annular projection may be formed by assembling ribs projecting on surfaces of the respective sub-housings substantially facing the receptacle to have an annular shape.

Even when the second housing is made up of plural sub-housings without being formed unitarily in this way, the annular projection can be formed by connecting the individual ribs end to end. Therefore an effect as the annular projection of the invention is exhibited, i.e. the flow of molten resin into the clearance of the fitting is prevented.

A front part of a first of the sub-housings may define a partial connecting portion forming part of the connecting portion together with one or more other sub-housings.

A part of the outer peripheral surface of the partial connecting portion facing the inner peripheral surface of the receptacle of the first housing may define a joint surface, and a part thereof to be held in contact with another sub-housing, with which the first sub-housing is to be assembled, may define a connection surface.

A plurality of substantially parallel annular projections may be formed. The flow of the molten resin into the connector can be blocked more reliably if the parallel annular projections are formed in a circumference direction to block the flow of the molten resin into the clearance of the fitting portion.

The case-integrated connector may further comprise at least one longitudinal rib crossing the rib and extending in forward and backward directions.

The annular projection may be formed by assembling ribs projecting on surfaces of the respective sub-housings substantially facing the receptacle to have a substantially annular shape.

These and other objects, features and advantages of the invention will become more apparent upon reading the following detailed description of preferred embodiments and accompanying drawings.

DETAILED DESCRIPTION OF THE PREFERRED EMBODIMENTS

One specific embodiment of the present invention is described with reference to FIGS. 1 to 12. A case-integrated connector 10 according to this embodiment is applied to a relay connector mounted in an automatic transmission of an automotive vehicle, and a case body 12 that at least partly covers the outer periphery of a connector 11 is formed by insert molding using the connector 11 as an insert. In the following description, respective directions are based on FIG. 1 and left and right sides of FIG. 1 are referred to as front and rear sides and a direction from the front side to the rear side of the plane of FIG. 1 is referred to as a width direction.

Figure 1:
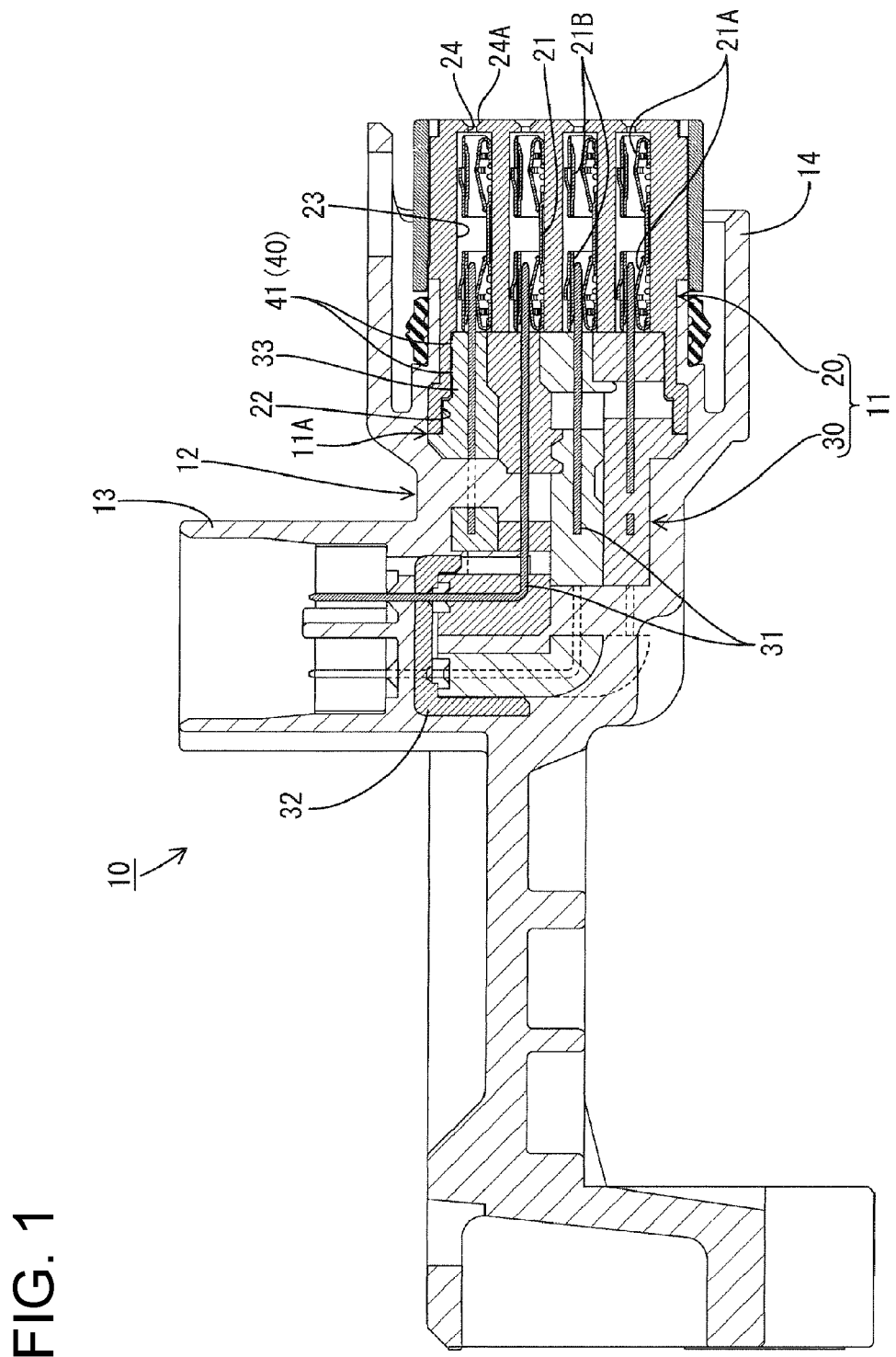
FIG. 1 is a section of a case-integrated connector according to one embodiment of the invention.

As shown in FIG. 1, The connector 11 is integrated by fitting a main body 30 that holds male terminal fittings 31 into a relay terminal holder 20 that accommodates female relay terminals 21 from behind. An alignment plate 32 is mounted near an upper end of the main body 30 at a position spaced from the relay terminal holder 20. The rear end of the relay terminal holder 20 is open to form a receptacle 22 that receives a connecting portion 33 of the main body 30, and joint surfaces of the receptacle 22 and the connecting portion 33 define a fitting portion 11A.

The case body 12 is made e.g. of synthetic resin and covers substantially the entire connector 11 while being held in close contact with a rear portion of the relay terminal holder 20 including the fitting portion 11A and the entire outer peripheral surface of the main body 30. An upper receptacle 13 is formed at a substantially intermediate part of the case body 12 in forward and backward directions and opens up to surround ends of the terminal fittings 31 projecting from a rear end portion of the main body 30. A forwardly open front receptacle 14 is formed at the front side of the case body 12 and surrounds a front part of the relay terminal holder 20. A receptacle (not shown) of a mating male connector is insertable into a space between the front receptacle 14 and the relay terminal holder 20.

Figure 12:
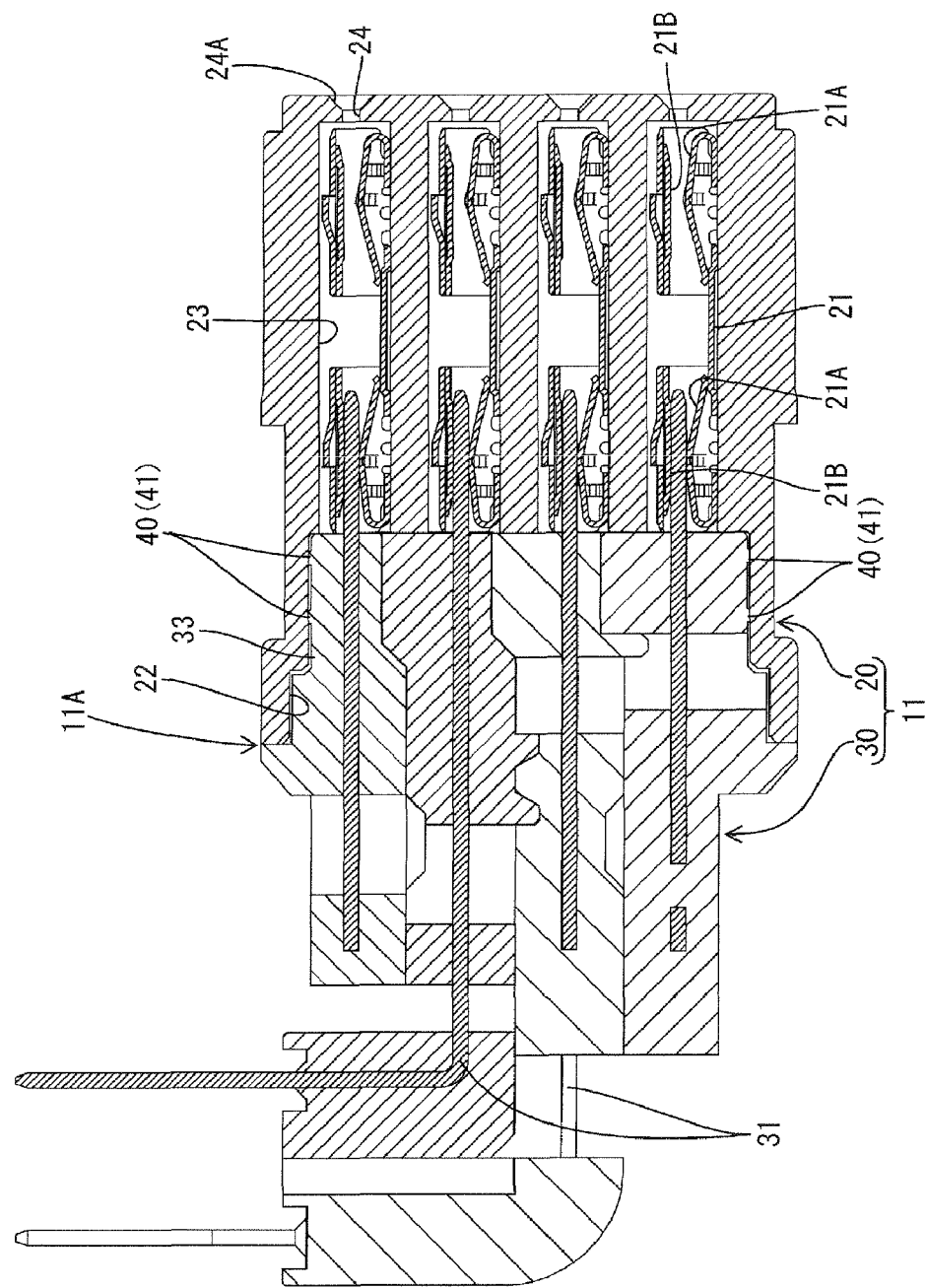
FIG. 12 is a section of a connector housing.

The relay terminal holder 20 is made e.g. of synthetic resin and, as shown in FIGS. 1 and 12, is substantially in the shape of a block with cavities 23 penetrating in forward and backward directions. The rear ends of the cavities 23 communicate with the interior of the receptacle 22, and the relay terminals 21 are accommodated individually into the cavities 23 from the side of the receptacle 22. The front ends of the cavities 23 communicate with insertion holes 24 at the front of the relay terminal holder 20, and guiding inclined surfaces 24A taper toward the cavities 23 at opening edges of the insertion holes 24 to guide mating terminals (not shown) into the insertion holes 24.

Each relay terminal 21 is formed by bending, folding and/or embossing an electrically conductive flat metal plate to form a forwardly and rearwardly open rectangular tube that extends along the inner peripheral surface of the cavity 23. Resilient contact pieces 21A are folded from front and rear end edges toward a substantially central part of the relay terminal 21 and downward bulging contact surfaces 21B are provided near the front and rear ends of the relay terminal 21 to face the resilient contact pieces 21A. The terminal fittings 31 are inserted into the relay terminals 21 by fitting the connecting portion 33 of the main body 30 into the receptacle 22 so that the terminal fittings 31 are sandwiched between the resilient contact pieces 21A and the contact surface portions 21B to achieve electrically conductive connection. Note that mating terminals inserted through the insertion holes 24 are connected similarly.

The main body 30 is formed by assembling (e.g. four) sub-housings 34 each of which holds one or more terminal fittings 31 with both ends of the terminal fittings 31 projecting from the sub-housing 34. The sub-housings 34 are made e.g. of synthetic resin and particularly include a first sub-housing 34A, a second sub-housing 34B, a third sub-housing 34C and a fourth sub-housing 34D assembled at least partly one over another in a vertical direction in this order from the top. A main construction of the sub-housings 34 is first described using the first sub-housing 34A.

Figure 2:
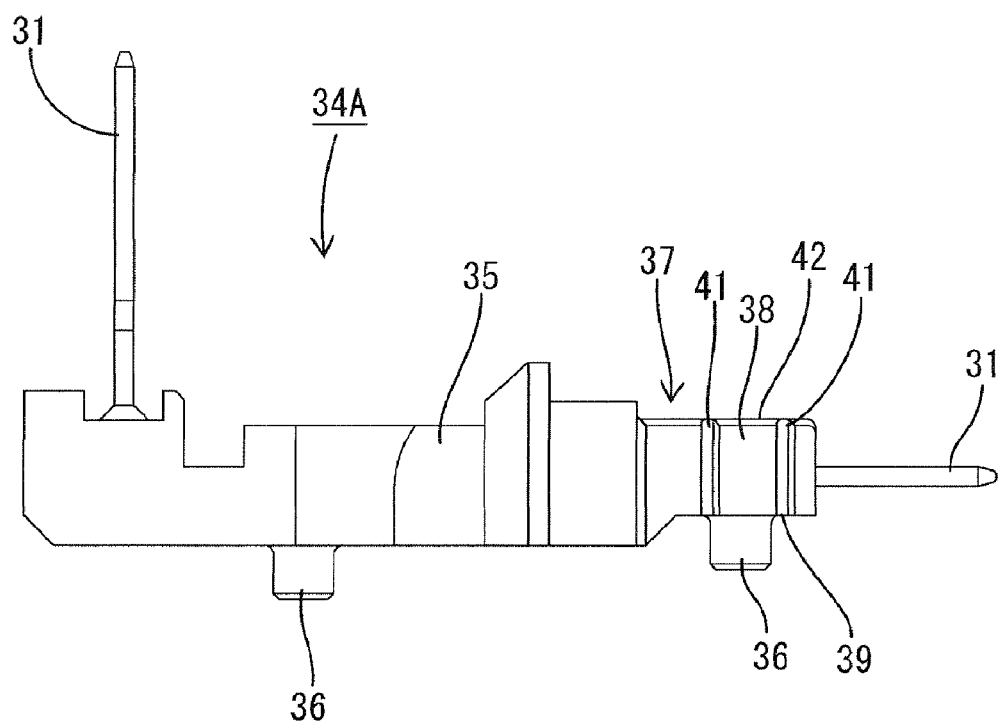
FIG. 2 is a side view of a first sub-housing constituting a main body.
Figure 3:
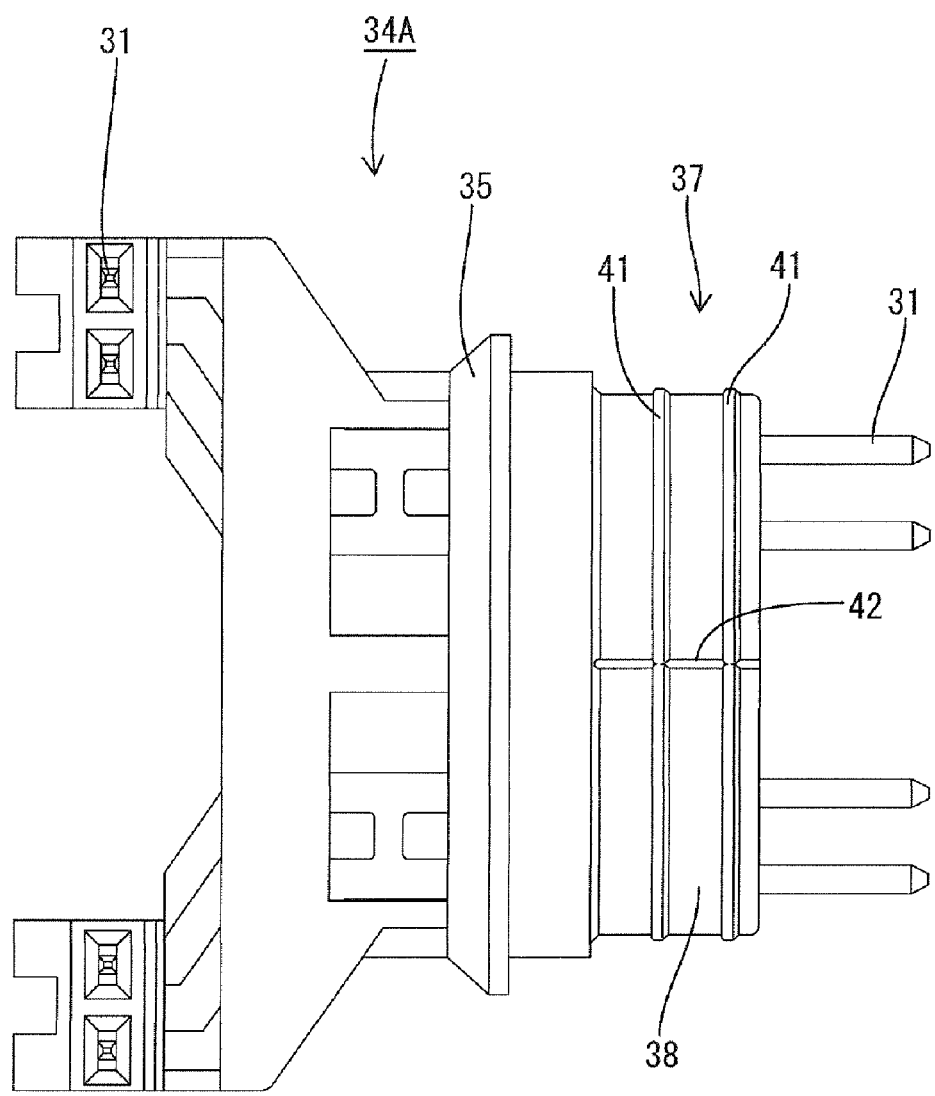
FIG. 3 is a plan view of the first sub-housing.
Figure 4:
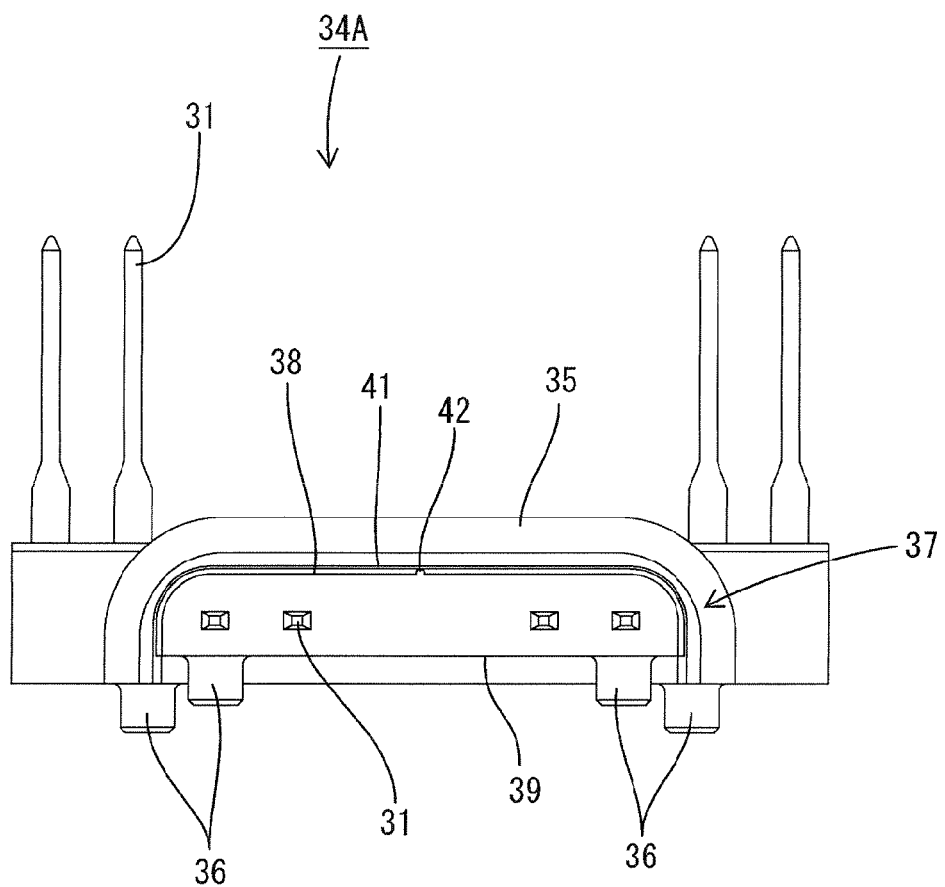
FIG. 4 is a front view of the first sub-housing.

As shown in FIGS. 2 to 4, the first sub-housing 34A has four terminal fittings 31 made of electrically conductive metal and held in a housing main body 35 made e.g. of synthetic resin by insert molding. Each terminal fitting 31 has opposite first and second ends. The first end of each terminal fitting 34A projects up from a rear upper part of the housing main body 35 and a second end is substantially normal to the first end and projects forward from the front end of the housing main body 35. Thus, the first sub-housing 34A is substantially L-shaped when viewed sideways, as shown in FIG. 2. The respective terminal fittings 31 are so aligned in the width direction as not to cross each other as shown in FIG. 3. As shown in FIG. 2 or 4, four rectangular fitting projections 36 project from the lower surface of the housing main body 35, and the first and second sub-housings 34A, 34B can be assembled at proper positions by fitting the fitting projections 36 into corresponding (unillustrated) fitting recesses of the second sub-housing 34B.

A partial connecting portion 37 is defined at a front part of the housing main body 35 and is part of the connecting portion 33 together with the other sub-housings 34. A joint surface 38 is defined at part of the outer peripheral surface of the partial connecting portion 37 facing the inner peripheral surface of the receptacle 22 of the relay terminal holder 20, and a connection surface 39 is defined at a part thereof to be held in contact with the second sub-housing 34B when the first and second sub-housings 34A and 34B are assembled. Two substantially parallel ribs 41 project from the joint surface 38 and extend in a circumferential direction. The ribs 41 projecting from the joint surfaces 38 of the sub-housings 34 become substantially continuous and form annular projections 40 when the sub-housings 34 are assembled to form the main body 30. At least one longitudinal rib 42 projects in a substantially widthwise intermediate part of the joint surface 38 of the first sub-housing 34A and extends in forward and backward directions to cross the ribs 41.

Figure 5:
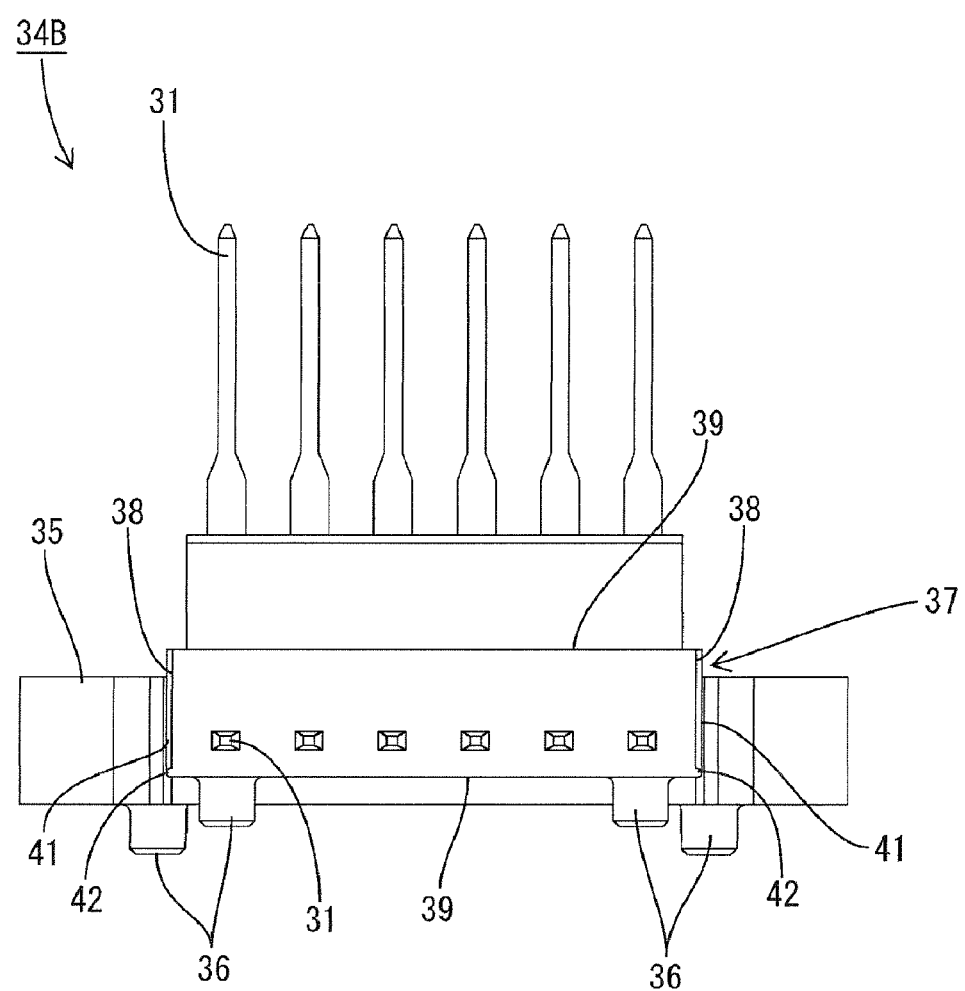
FIG. 5 is a front view of a second sub-housing.

As shown in FIG. 5, the second sub-housing 34B is similar to the first sub-housing 34A. However, the first sub-housing 34A is assembled with the second sub-housing 34B from one side (e.g. above) and the third sub-housing 34C is assembled with the second sub-housing 34B from the opposite side (e.g. below). Thus, the positions of joint surfaces 38 and connection surfaces 39 differ. Specifically, upper and lower surfaces of a partial connecting portion 37 define connection surfaces 39 and the opposite widthwise side surfaces define joint surfaces 38. Two substantially vertical ribs 41 project from the joint surfaces 38 and are arranged to become continuous with the respective ribs 41 of the first and third sub-housings 34A, 34C when the sub-housings 34 are assembled at proper positions. Longitudinal ribs 42 project at lower ends of the respective joint surfaces 38 and extend forward and backward to cross the respective ribs 41.

Figure 6:
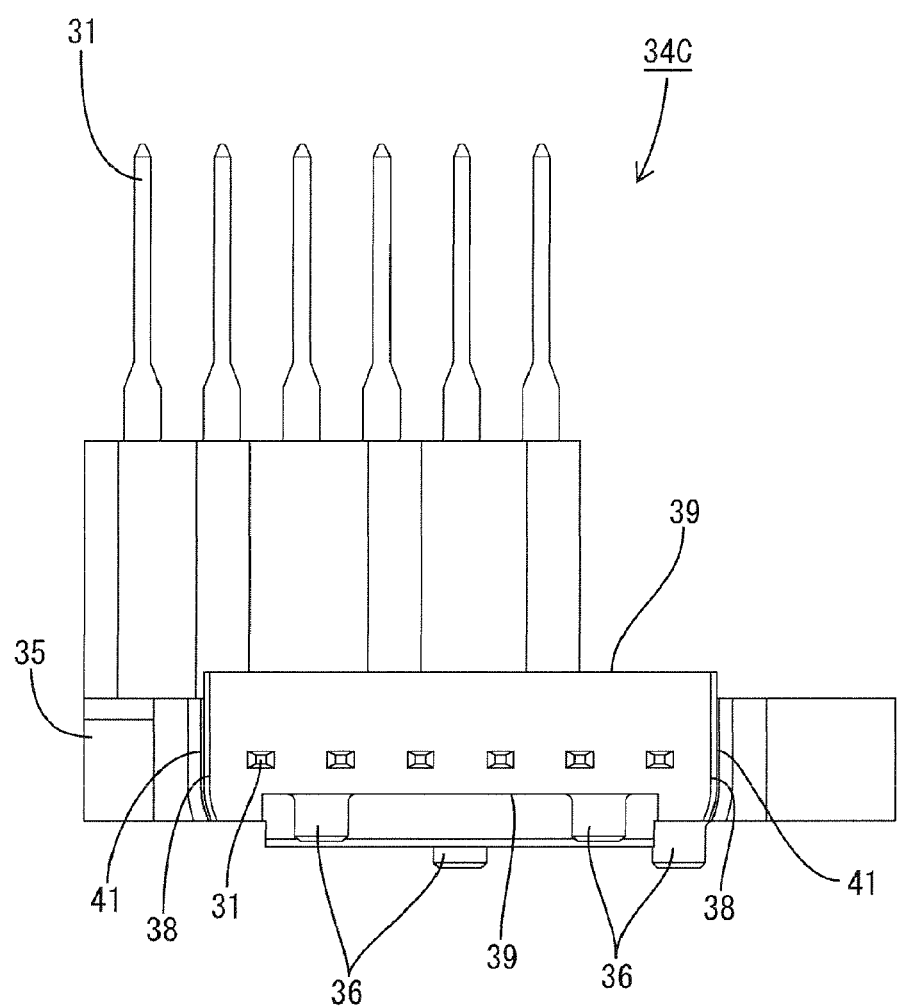
FIG. 6 is a front view of a third sub-housing.

As shown in FIG. 6, the third sub-housing 34C has a construction substantially similar to the second sub-housing 34B. Joint surfaces 38 are substantially opposite widthwise sides surfaces of a partial connecting portion 37, and two vertically extending ribs 41 project on the joint surfaces 38. Similar to the second sub-housing 34B, these ribs 41 are also arranged to become substantially continuous with the respective ribs 41 of the second and fourth sub-housings 34B, 34D when the respective sub-housings 34 are assembled at the proper positions. Note that, unlike the second sub-housing 34B, particularly no longitudinal ribs 42 are formed on the third sub-housing 34C.

Figure 7:
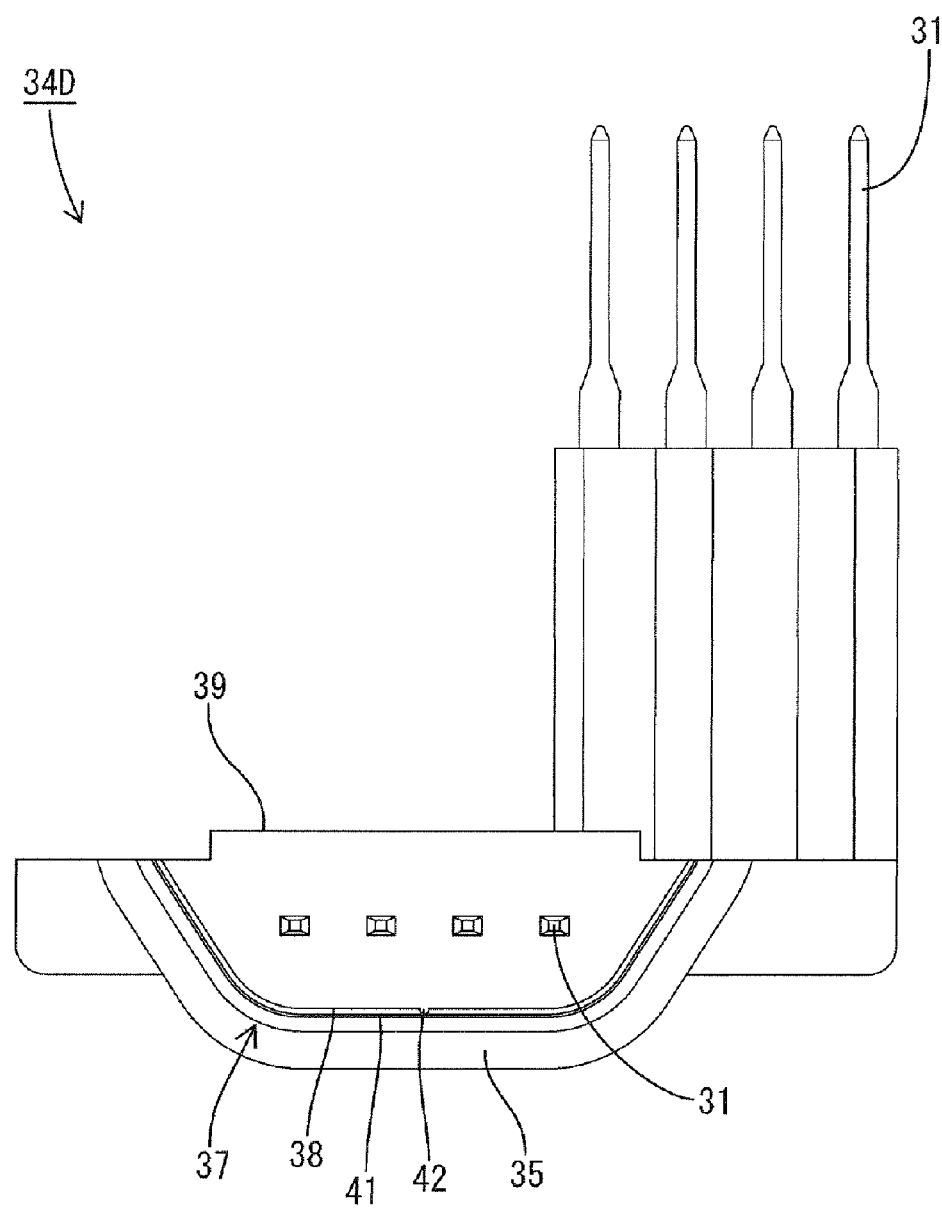
FIG. 7 is a front view of a fourth sub-housing.
Figure 8:
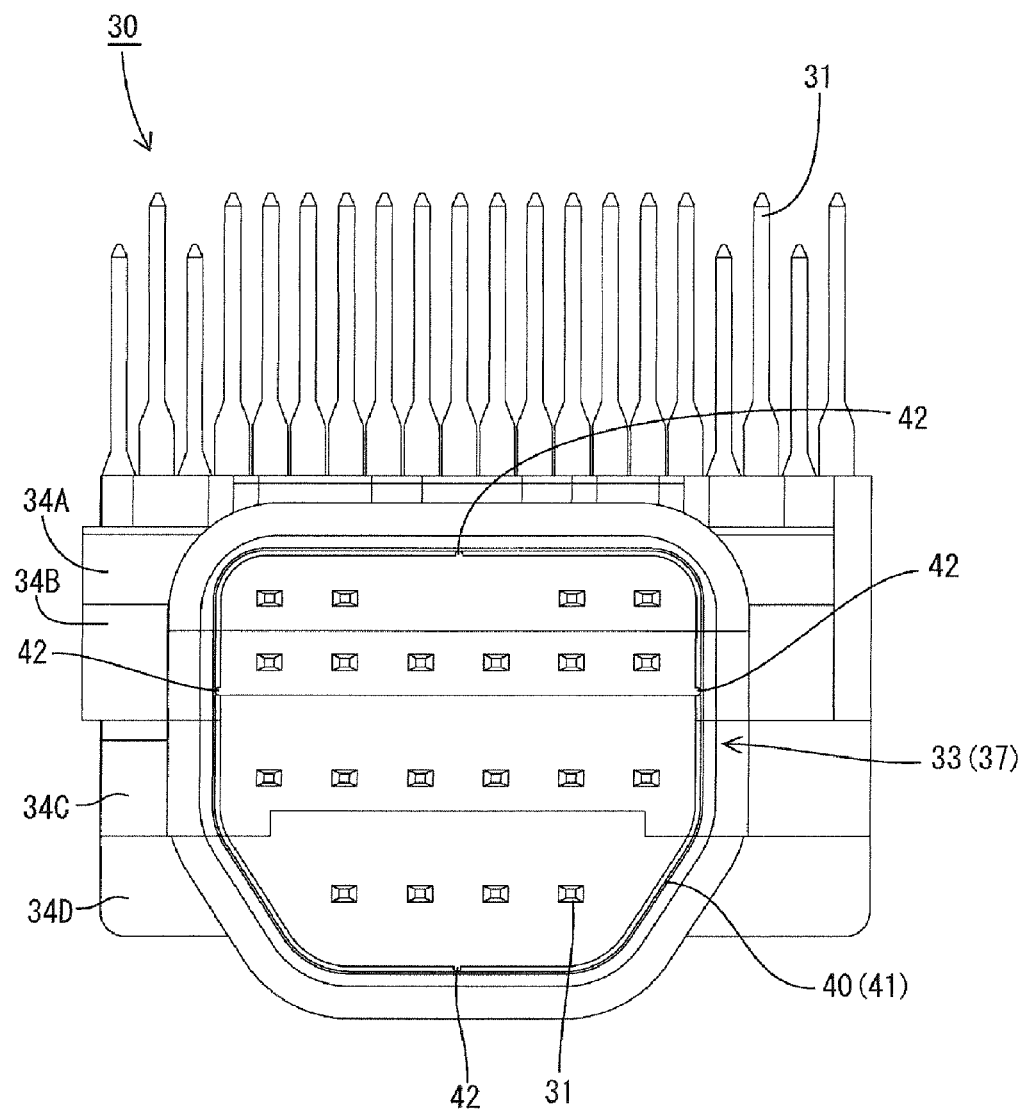
FIG. 8 is a front view of the main body.
Figure 9:
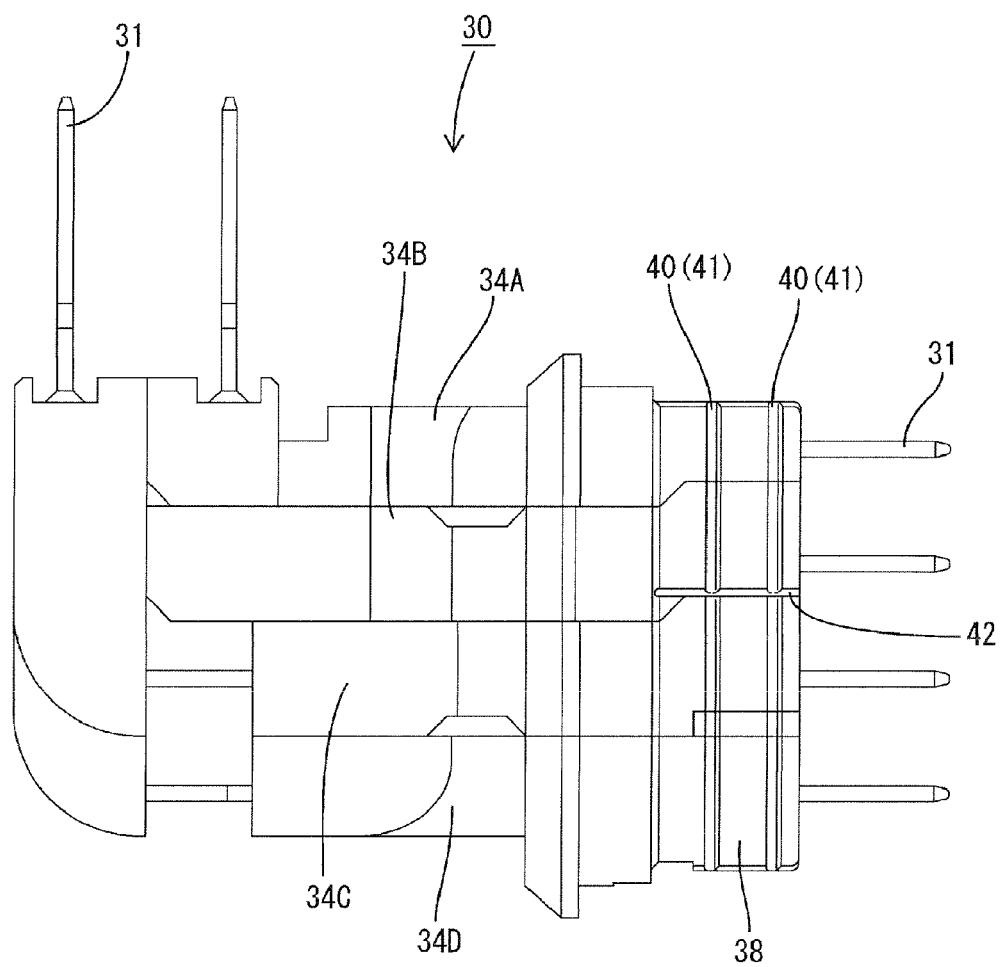
FIG. 9 is a side view of the main body.
Figure 10:
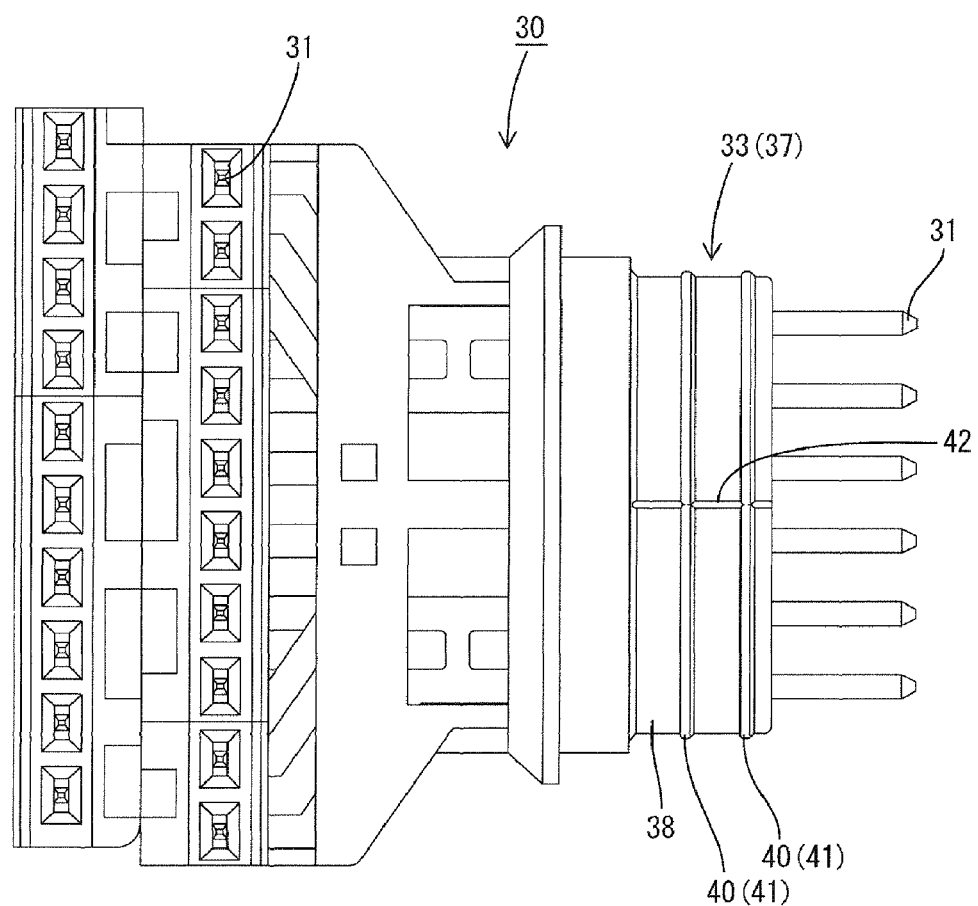
FIG. 10 is a plan view of the main body.
Figure 11:
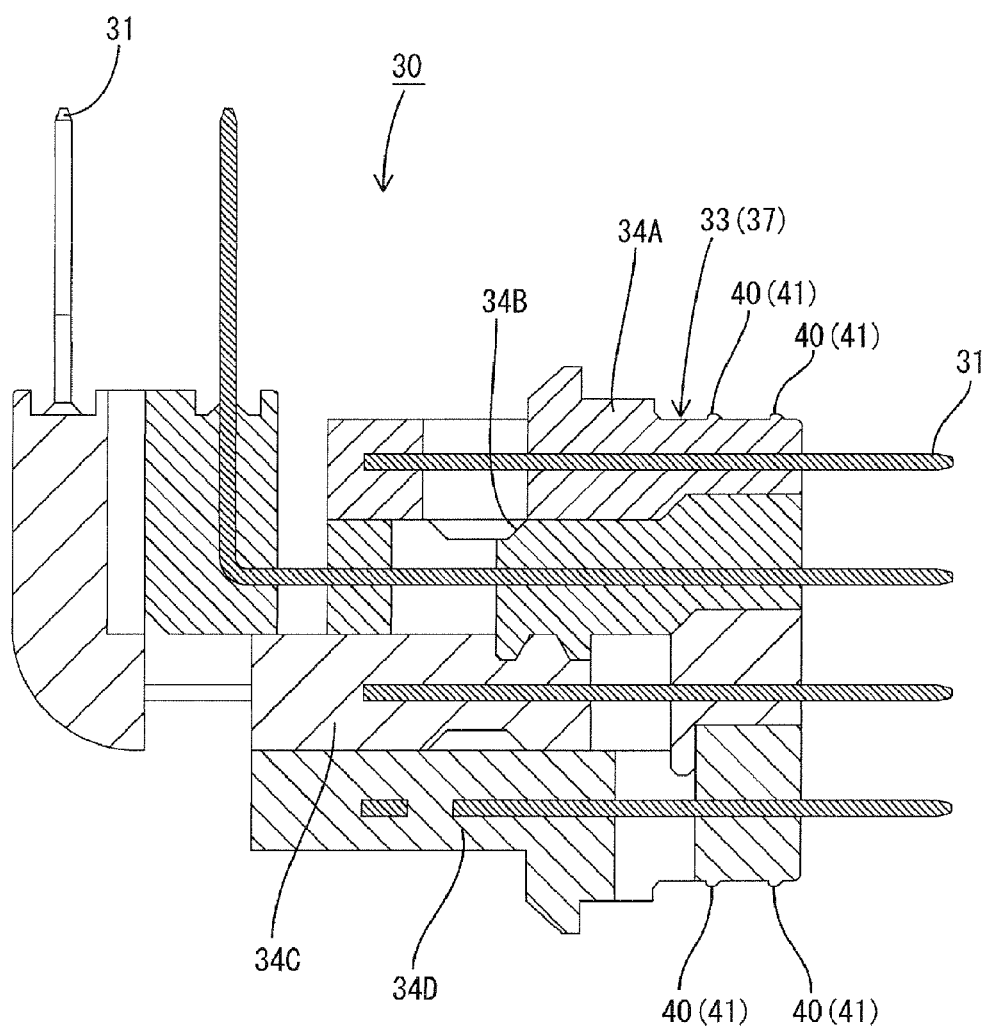
FIG. 11 is a section of the main body.

As shown in FIG. 7, the fourth sub-housing 34D has a partial connecting portion 37. A connection surface 39 is defined on the top of the partial connecting portion 37 and a joint surface 38 is defined at other parts of the outer peripheral surface. Two substantially parallel ribs extend in a circumferential direction on the joint surface 38, and upper ends of the ribs 41 are arranged to become substantially continuous with the respective ribs 41 of the third sub-housing 34C when the third and fourth sub-housings 34C and 34D are assembled. Further, similar to the first sub-housing 34A, a longitudinal rib 42 is provided on a widthwise intermediate part of the joint surface 38 and extends in forward and backward directions to cross the ribs 41. Unlike the other sub-housings 34, the fourth sub-housing 34D has no fitting projections 36, but has unillustrated fitting recesses into which fitting projections 36 of the third sub-housing 34C are to be fit.

The main body 30 shown in FIGS. 8 to 11 is formed by assembling the respective sub-housings 34. By assembling the respective sub-housings 34, the one or more ribs of the sub-housings 34 become continuous to form the annular projections 40 projecting out over the entire peripheral surface of the connecting portion 33. Longitudinal ribs 42 extend in forward and backward directions on each of the upper and lower surfaces and on the opposite widthwise side surfaces of the connecting portion 33 while crossing the annular projections 40 to provide four longitudinal ribs 42.

The constructed main body 30 is assembled with the relay terminal holder 20 so that projecting end surfaces of the annular projections 40 and the longitudinal ribs 42 are held substantially entirely in contact with the inner peripheral surface of the receptacle 22 in the fitting 11A as shown in FIG. 12. A small clearance is formed between the receptacle 22 and the connecting portion 33 for absorption of a dimensional error, an assembling error or other reasons. However, the main body 30 is positioned with respect to the relay terminal holder 20 while a so-called play is filled up by the annular projections 40 and the longitudinal ribs 42. Further, the clearance is partitioned by the annular projections 40 held in close contact with the inner peripheral surface of the receptacle 22 in forward and backward directions and partitioned by the longitudinal ribs 42 likewise held in close contact with the inner peripheral surface of the receptacle 22 in the width direction.

The connector 11 with the main body 30 fit into the relay terminal holder 20 is positioned as an insert in a mold for secondary molding and the mold is closed. A molding space corresponding to the case body 12 is defined in the closed mold. Molten resin then is filled into the molding space and an injection pressure acts on the outer peripheral surface of the connector 11. The molten resin in the fitting 11A may intrude into the clearance between the receptacle 22 and the connecting portion 33 due to this injection pressure. However, the annular projections 40 of the connecting portion 33 closely contact the inner peripheral surface of the receptacle 22 to block any further intrusion of the molten resin.

As described above, molten resin has the potential to flow into the interior of a multi-part connector that is used as an insert depending on the injection pressure of the molten resin during insert molding. However, the subject invention has annular projections 40 on the connecting portion 33 of the main body 30 in the fitting 11A of the subject invention. The annular projections 40 are held in close contact with the inner peripheral surface of the receptacle 22 of the relay terminal holder 20 as the facing surface. Thus, the annular projections 40 block the molten resin from intruding through the clearance of the fitting 11A and to the cavities 23.

The main body 30 is made of plural sub-housings 34 and the ribs 41 formed on the respective sub-housings 34 become annularly continuous when the sub-housings 34 are assembled. Each annular projection 40 of the subject invention functions substantially the same as a unitary annular projection on a unitary housing. Also the annular projections 40 are connected by ribs 41 to reduce the possible flow of molten resin into the cavities 23 through the clearance of the fitting 11A when the case body 12 is insert-molded using the connector 11 including the sub-housings 34 as an insert.

The two parallel annular projections 40 block the flow of the molten resin into the cavities 23 more reliably.

A small clearance is formed between the receptacle 22 and the connecting portion 33 and can be a cause of intrusion of the molten resin. However, the annular projections 40 and the longitudinal ribs 42 suppress loose movement of the main body 30 relative to the relay terminal holder 20 and hence prevent resin intrusion.

The invention is not limited to the above described and illustrated embodiment. For example, the following embodiments also are included in the scope of the invention.

The annular projections 40 project from the connecting portion 33 of the main body 30 and contact the inner peripheral surface of the receptacle 22 of the relay terminal holder 20 as the facing surface in the above embodiment. However, the annular projections may project, for example, from the inner peripheral surface of the receptacle 22 of the relay terminal holder 20 and may be in contact with the connecting portion 33 of the main body 30 without being limited to such an arrangement. Alternatively, one annular projection 40 may project from the connecting portion 33 toward the inner peripheral surface of the receptacle 22 and the other may project from the receptacle 22 toward the connecting portion 33.

The main body 30 is formed by assembling four sub-housings 34 in the above embodiment. However, the main body 30 may be made up of one, two, three, five or more sub-housings 34 or it may be unitarily or integrally formed without being limited to such an arrangement. Accordingly, the annular projections 40 of the present invention effectively block the intrusion of the molten resin from the fitting 11A into the cavities 23.

Two annular projections 40 are formed in the above embodiment. However, one, three or more annular projections may be formed. If one annular projection is provided, an insertion force at the time of fitting the main body 30 into the relay terminal holder 20 can be suppressed. Conversely, if three or more annular projections are provided, the flow of molten resin into the cavities 23 from the fitting portion 11A can be blocked more reliably.

What is claimed is:

1. A case-integrated connector, comprising: a first housing including a receptacle at one end, the receptacle having a first facing surface facing into the receptacle; a second housing formed by assembling a plurality of sub-housings, the second housing including a connecting portion with an outwardly facing second facing surface fit into the receptacle and facing the first facing surface to define a connector including a fitting where the receptacle of the first housing and the connecting portion of the second housing abut each other; a case body defining a unitary matrix of resin surrounding and covering at least parts of an outer peripheral surface of the fitting; and at least one annular projection formed by ribs projecting from surfaces of the respective sub-housings facing the receptacle and contacting the first facing surface of the receptacle, the ribs being assembled so that the projection has a substantially annular shape extending over substantially an entire periphery of the facing surfaces.

2. The case-integrated connector of claim 1, wherein a front part of a first of the sub-housings defines a partial connecting portion forming part of the connecting portion together with one or more other sub-housings.

3. The case-integrated connector of claim 2, wherein a part of the outer peripheral surface of the partial connecting portion facing the inner peripheral surface of the receptacle of the first housing defines a joint surface, and a part thereof to be held in contact with another of the sub-housing, with which the first sub-housing is assembled, defines a connection surface.

4. The case-integrated connector of claim 1, wherein the at least one projection comprises a plurality of substantially parallel projections.

5. The case-integrated connector of claim 1, further comprising at least one longitudinal rib crossing the rib and extending in forward and backward directions.

6. A case-integrated connector, comprising: a first housing including a receptacle at one end, the receptacle having a first facing surface facing into the receptacle; a plurality of sub-housings assembled together to define a second housing including a connecting portion with an outwardly facing second facing surface fit into the receptacle and facing the first facing surface to define a connector including a fitting where the receptacle of the first housing and the connecting portion of the second housing abut each other, ribs projecting on surfaces of the respective sub-housings facing the receptacle, the ribs being assembled to define at least one continuous peripheral projection extending around an entire periphery of the second housing; and a case body defining a unitary matrix of resin surrounding and covering at least parts of an outer peripheral surface of the fitting.

7. The case-integrated connector of claim 6, wherein the at least one continuous peripheral projection comprises two parallel continuous peripheral projections.

8. The case-integrated connector of claim 6, further comprising at least one longitudinal rib crossing the continuous peripheral projection and extending in forward and backward directions.

* * * * *